106. COMPOSITIONS, COATING OR PLASTIC.

Patented Dec. 30, 1930

1,787,162

UNITED STATES PATENT OFFICE

GUSTAVE ADOLPH NEW, OF PORT CLINTON, OHIO, ASSIGNOR TO AMERICAN GYPSUM COMPANY, OF PORT CLINTON, OHIO, A CORPORATION OF OHIO

STUCCO MIX AND PROCESS FOR MAKING THE SAME

No Drawing. Application filed May 19, 1927. Serial No. 192,793.

This invention relates to improvements in stucco mix and more especially to a new composition of matter of which stucco or calcined gypsum in its commercial form is the base.

The object of the invention is to provide a new and useful composition or substance of the character described to be used as a building material or in the manufacture of building materials, and having as its essential qualities or properties a high degree of heat and sound insulation, durability in its capacity to withstand handling and transportation, highly resistive to penetration by water and moisture, and relatively light in weight.

Of the qualities above enumerated, those of lightness and moisture repelling appear to be of increasing importance in the art, and a problem that has received considerable attention in the industry. Numerous expedients have been devised to decrease the weight of the stucco, the earliest and more common having been that of mixing sawdust, pulp, and similar inert materials with the stucco. A more recent departure has been the introduction of certain active substances which will give the stucco porous or cellular texture, as for example, by the addition of certain acids or carbonaceous substances calculated to liberate gases which disseminate through the mass in small globules and thus create cells or pockets. Other attempts have been made to utilize certain carbohydrates of the starch group, calculated to function in a similar manner.

The difficulty with such methods primarily arises from the inability to control the reactions within the ranges necessary to insure uniformity of product, particularly with the varying grades of raw gypsum from which the stucco is derived. Another and equally serious difficulty is the inherent affinity for moisture exhibited by the ingredients added to produce a lighter and less dense product, with the result that any advantage gained on the one hand is offset by the rapid deterioration by moisture absorption, on the other. Moreover the addition of the substances heretofore used for decreasing the weight or density of the stucco tends to retard the drying process and hence prolong the period required for drying.

It is conceived, therefore, that any ingredient, substance or prepared mixture of several substances added to the stucco or incorporated in a mixture of which stucco is the base, for the purpose of producing a relatively light mix, must have those properties which will create a stable homogeneous mass of uniform density throughout, which can be readily controlled in its action, which will be inherently moisture repelling, that is, of a moisture-proof character, and finally, which will not unduly retard on the one hand, or hasten on the other, the setting of the stucco, and further, will not prolong the drying operation.

A composition of matter having these properties and exhibiting the characteristics in the finished product as above set forth, will now be described together with the methods by which it may be compounded and then introduced into the stucco.

At the outset it may be stated that in the manufacture of the product and in the practice of the process here involved, I discard entirely the use of acids or carbohydrates to bring about the desired result, and select a basic ingredient from the group of physico-chemical substances known as proteids, this ingredient being albumin.

The source of the albumin found most satisfactory for the purpose is the so-called blood albumin or dried blood, such as is obtained as a by-product of the packing or meat industry. Other forms of albumin would be satisfactory but their source is so limited that the cost would be prohibitive. I have in mind particularly egg albumin.

In its commercial form, blood albumin is a dry powder which readily dissolves in water, although, as will hereinafter appear, it may be used either in dry form or in solution. Nor need the blood albumin be highly refined, although the blood of cattle, i. e., ox blood, is found to give more satisfactory results than the blood of other animals, such as hogs or sheep.

The dried blood alone will not give the desired results, as can be demonstrated by agitating or beating a solution of the same in water. A froth will form, but it will be of a negligible quantity and such as is produced is without body and unstable, that is, the froth will soon break down and return to its liquid state. I have discovered that by adding lime to the solution, an entirely different result follows, namely, that on beating or agitation, the foam created is most voluminous, and when once produced will remain stable without any appreciable breaking down of the foam mass. Indeed, it will retain its initial texture almost indefinitely even though all the moisture has been evaporated, leaving a light, fluffy and brittle residue.

I have discovered, therefore, that the essential ingredients of an entirely satisfactory composition for producing a so-called light stucco mix, is dried blood or its equivalent, and lime or its equivalent. The lime preferably used is either burned lime (CaO) or hydrated or slacked lime, Ca(HO)$_2$, and its function in the mixture is to react with the albumin and convert it into glue, thus bringing about the marked volume, stability and uniformity of the foam produced when subjected to beating or violent agitation. I have also found that improved results are obtained by adding a quantity of animal glue or other suitable glue not of the carbohydrate group, as it increases the stiffness of the froth and also has certain advantageous effects on the stucco when the final mix takes place, namely, to give increased strength and toughness to the stucco, and when it is used in the manufacture of plaster board, create a bond between the mass of stucco and the covering material.

I shall first describe the method and proportions used in making a satisfactory foam producing compound, which when beaten into a stable foam of fine texture is introduced into relatively large batches of wet stucco and thoroughly mixed therewith. The following proportions are general and hold for any amount being made from a small batch, to the capacity output of a commercial plant. Considering the proportions of the raw materials entering into the foaming composition, they are roughly, two (2) parts of dried blood to one (1) part each of lime and glue. Thus, to form a satisfactory foaming composition or agent, quantities of blood albumin, lime and glue in the proportions just stated are dissolved in an excess of water. The solution is then beaten or stirred violently and the foam removed as rapidly as it is formed until the entire solution has been converted. The foam is then thoroughly mixed with a batch of wet stucco and when the mass has been allowed to set and dry out, it becomes a hard, tough and light composition, having a structure revealed under the ordinary magnifying glass as of a uniformly porous or cellular texture and consisting of an infinite number of minute air bubbles surrounded by and encased in thin walls of stucco separating the cells. Manifestly the quantity of foam added to the stucco may be varied depending on the desired density of the final product.

In commercial manufacture of gypsum products, the same general procedure is followed and results obtained, except on a vastly larger scale and with certain variations and allowances for the particular grade of gypsum rock being used at the time, it being well known that there exist certain variations in the chemical composition of the rock mined in different localities, as well as in that taken from different strata of the same mine.

But assuming an average daily output of say 125 tons of stucco, I have estimated the amount by weight of the ingredients required to produce the required foaming solution to be substantially as follows:

Blood albumin_____ 75 to 100 lbs.
Lime_____ 40 to 50 lbs.
Glue_____ 40 to 50 lbs.

Or, roughly, 200 lbs. of the foaming mixture to 125 tons or 250,000 lbs. of stucco, which reduced to unit proportions would be 1 lb. of the mixture to 1250 lbs. of stucco. The weights given for the ingredients as well as the stucco do not include the water required to form the foaming solution or the water content of the wet stucco, since it is assumed that both are evaporated in the drying process and hence may be disregarded.

As already stated, these figures and proportions are only approximate but are sufficiently accurate to provide a working base, and further to give a clear conception of the relatively small amount of the raw ingredients necessary to produce the enormous volume of foam required for a large output of relatively light stucco, which can be safely estimated to be from 25% to 40% lighter per unit of volume than the same stucco without the foaming agent added.

In addition to the lighter weight of the product, it derives other beneficial results from the addition of the ingredients composing the foam. In the first place, the lime which is slacked in water in the mixing and foaming process, is partially in its free state after it has been introduced into the stucco and when the same has set, the free lime (CaO) absorbs a certain quantity of the carbon dioxide ($CO_2$), eventually forming calcium carbonate ($CaCO_3$) which aids in giving increased strength to the finished material. The lime also acts to neutralize the tendency of the proteid constituents of the foam to retard the setting of the stucco, that is, the crystallization which takes place immediately upon the absorption of water by the dry stucco. In this way, the light cellular texture is obtained without interfering with the normal setting of the stucco.

Moreover, the presence of the glue makes the stucco of a harder and tougher consistency without making it brittle, aside from giving it that element of adhesiveness already referred to in connection with the manufacture of plaster and wallboard. And finally, there is the important advantage of the increased water and moisture repellent properties of the stucco due to presence of the albumin, the water-proofing properties of which have been recognized although not its superior foam producing qualities until my discovery that lime or an equivalent alkaline reagent was essential to this end. Thus the increased moisture repellent properties of the stucco not only facilitate the drying process during manufacture, but resists penetration by and absorption of moisture in the finished product, without showing any efflorescence on the surface of the finished product, which is quite the reverse in the ordinary forms of stucco and particularly those to which carbohydrates, soap derivatives, and the like, have been added to lighten or decrease the density of the mix.

There are several methods of producing a light stucco mix, utilizing my discovery, one of which has already been suggested in the preceding discussion, namely, the production of the foam in a continuously operating mixing and agitating apparatus and introducing the same into the stucco immediately after it has been subjected to soaking or mixing with water. A suitable apparatus would consist of a tank or vat into which the several foaming ingredients are introduced together with sufficient water to form a solution which is constantly agitated. A pipe leading from the solution tank leads to a foamer so-called, in which the solution is subjected to a beating or stirring, the foam thus created overflowing into the mass of wet stucco immediately after it has emerged from contact with water on a soaking belt or other mixing apparatus and then incorporated into the mass by mechanical mixers or introduced directly into a suitable continuous mixer which mixes the dry stucco, water and foam together, and discharges the whole as a light mix.

Such a process would ordinarily be used where the so-called light mix forms the core in the manufacture of wall and plaster board by the continuous process, or in making of blocks used for walls and partitions, and any other gypsum product manufactured in finished form for use by the consumer.

However, the light mix is also suitable for extensive use as an insulating filler, which is mixed and poured "on the job" in the same manner as concrete or plaster. For such purposes, the stucco in dry form would be mixed with the foaming ingredients also in dry form and the builder or user would then add water and mix as it is needed. So too, the so-called foaming ingredients can be shipped and handled in dry form separately from the stucco to be subsequently mixed with water and stucco for whatever purpose desired. In other words, the light mix is capable of being formed in a number of different ways, and the foaming composition or compound capable of being put on the market and otherwise available for use in different forms without regard to the particular use to be made of the stucco mix.

Therefore, in disclosing the various methods of producing a light mix or the forms in which it or the foaming compound may be made for commercial use, I do not intend to be limited to any specific form, process of manufacture or method of use.

I claim as my invention:

1. A composition for producing a gypsum product of cellular texture consisting of a mixture of calcined gypsum, water, and a foam formed by agitating a solution containing substantially two parts of blood albumin and one (1) part of hydrated lime.

2. A gypsum product of cellular texture consisting of a mixture of substantially twelve hundred fifty (1250) parts of calcined gypsum and water, and one part of a foam, composed of an agitated solution of two parts of blood albumin and one (1) part of hydrated lime.

3. A process of producing a gypsum product of cellular texture consisting of introducing into a mass of wet calcined gypsum a foam composed of an agitated solution of blood and lime.

4. A process of producing a gypsum product of cellular texture, consisting of introducing into a mass of wet calcined gypsum a foam composed of an agitated solution of blood albumin and hydrated lime.

5. A process of producing a gypsum product of cellular texture consisting of forming a solution of water, blood albumin and lime, agitating said solution to a foam consistency and mixing said foam with wet calcined gypsum.

6. A process of producing a relatively light stucco mix, consisting of forming a solution of substantially two (2) parts of dried blood, and one (1) part of lime, beating said solution into a foam and mixing said foam with wet calcined gypsum.

7. A process of producing a cellular gypsum mix, consisting of forming a solution of substantially two (2) parts of dried blood, and one (1) part of lime, beating said solution into a foam and mixing said foam with wet calcined gypsum in the proportion of substantially one (1) pound of the solid ingredients of the foam to twelve hundred and fifty (1250) pounds of calcined gypsum.

8. A composition for producing a gypsum product of cellular texture consisting of a mixture of calcined gypsum in plastic form and a foam consisting of an agitated solution of blood albumin and lime.

Signed at Port Clinton, Ohio, this 11th day of May, 1927.

GUSTAVE ADOLPH NEW.